United States Patent [19]
Estelle et al.

[11] Patent Number: 5,717,525
[45] Date of Patent: Feb. 10, 1998

[54] ZOOM LENSES

[75] Inventors: Lee R. Estelle; Barbara J. Kouthoofd, both of Rochester, N.Y.

[73] Assignee: Eastman Kodak Company, Rochester, N.Y.

[21] Appl. No.: 639,585

[22] Filed: Apr. 29, 1996

[51] Int. Cl.$^6$ .......................... G02B 15/15; G02B 15/14; G02B 13/00; G02B 3/08
[52] U.S. Cl. .......................... 359/677; 359/684; 359/689; 359/724; 359/742; 359/743
[58] Field of Search .................................. 359/677, 684, 359/742, 691, 692, 724, 689, 690, 743

[56] References Cited

U.S. PATENT DOCUMENTS

| | | | |
|---|---|---|---|
| 3,044,355 | 7/1962 | Cox et al. | 88/57 |
| 4,934,795 | 6/1990 | Estelle | 350/427 |
| 5,013,133 | 5/1991 | Buralli et al. | 350/162.11 |
| 5,268,790 | 12/1993 | Chen | 359/558 |
| 5,301,064 | 4/1994 | Sugi et al. | 359/684 |

*Primary Examiner*—David C. Nelms
*Assistant Examiner*—Evelyn A. Lester
*Attorney, Agent, or Firm*—Svetlana Z. Short

[57] ABSTRACT

In order to reduce complexity and cost of fabrication of zoom lenses, the real image forming lens group module at the front of the zoom lens is replaced with a two-element group where one of the elements has a diffractive lens on a curved surface thereof instead of the usually cemented doublet of the front group, but with substantially the same aberrations as a front group with three elements, including a cemented doublet. Aberrations (chromatic and monochromatic) produced by the first and second groups remain corrected by the combination of these groups over the zoom range of the lens. A second group housing two-elements, one of which has a curved surface on which a diffractive lens is provided, may be also be used to replace the three-element second lens group and particularly the cemented doublet thereof. The two-element second group has substantially the same aberrations as the three-element group with a cemented doublet and the aberrations with zoom motion are corrected by the combination of the first and second groups even though each of them has two elements and a diffractive lens on a curved surface of one of their elements. The zoom lens thus maintains performance of zoom lenses having at least two additional elements and at lower cost than such zoom lenses with additional elements.

20 Claims, 17 Drawing Sheets

FULL FIELD 4.98 deg 0.7 FIELD 3.48 deg

ON-AXIS 0 deg

FULL FIELD 25.8 deg 0.7 FIELD 18.1 deg

ON-AXIS 0 deg

DELTA X

FULL FIELD
4.98 deg
DELTA Y

DELTA X 0.7 FIELD
3.48 deg
DELTA Y

DELTA X

ON-AXIS
0 deg
DELTA Y

FULL FIELD 25.8 deg 0.7 FIELD 18.1 deg

ON-AXIS 0 deg

FULL FIELD
3.16 mm 0.7 FIELD
2.21 mm

ON-AXIS
0 mm

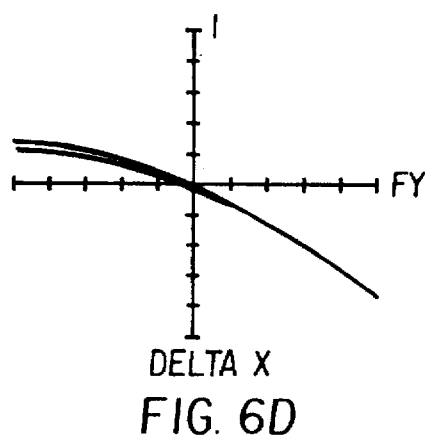
FIG. 6D DELTA X
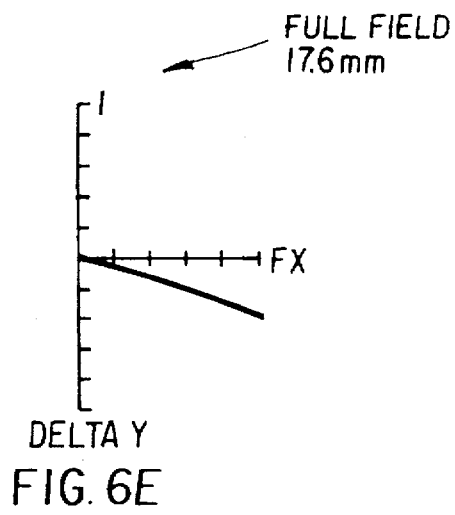
FULL FIELD 17.6mm
FIG. 6E DELTA Y
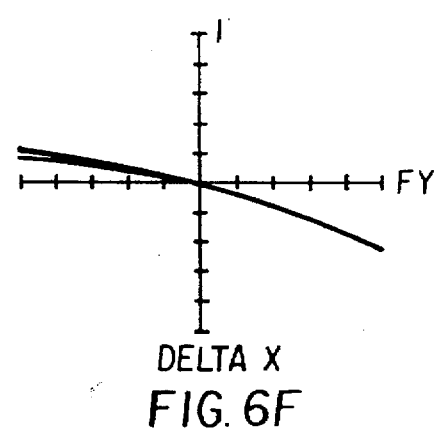
FIG. 6F DELTA X
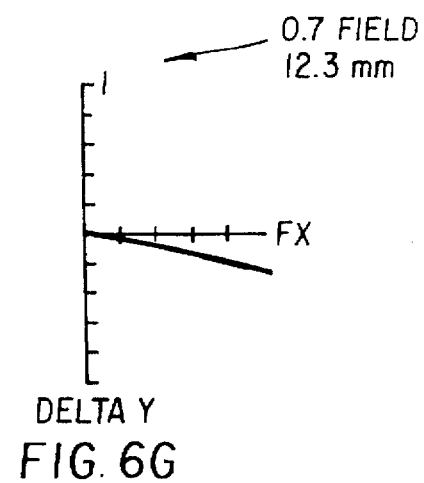
0.7 FIELD 12.3 mm
FIG. 6G DELTA Y
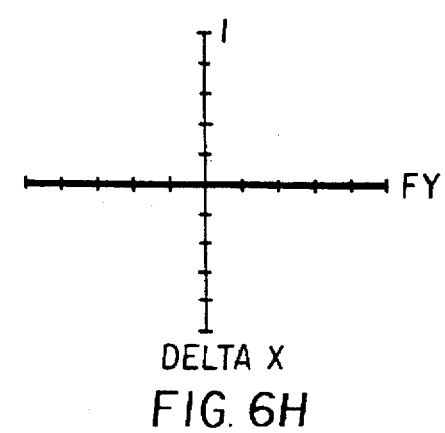
FIG. 6H DELTA X
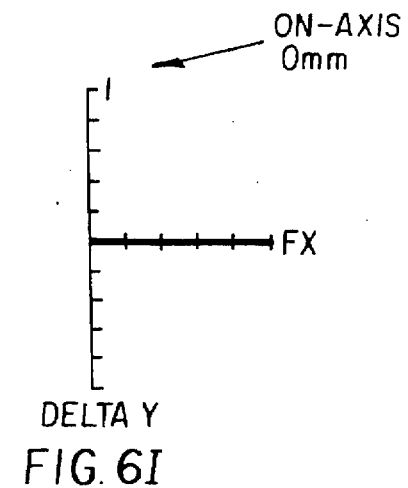
ON-AXIS 0mm
FIG. 6I DELTA Y FULL FIELD
3.16 mm 0.7 FIELD
2.21 mm ON-AXIS
0 mm

DELTA X

FULL FIELD
17.6 mm

DELTA Y

DELTA X 0.7 FIELD
12.3 mm

DELTA Y

DELTA X

ON-AXIS
0 mm

DELTA Y

ZOOM LENSES

FIELD OF THE INVENTION

The present invention relates to zoom lenses and particularly to zoom lenses which have a magnification range of at least three times (3×) and which may be as high as 12× and has in all positions over the zoom range an F/# not exceeding 2.0.

The invention provides zoom lenses using diffractive optics which provides performance similar to conventional multi-element zoom lenses but with fewer elements and eliminates the need for doublets particularly doublets having a cemented interface, thus leading to zoom lenses of lower cost but with performance in terms of sharpness of image over the image field of the lens and absence of aberration, both chromatic and monochromatic, as can be obtained with more complex and costly to manufacture multiple element zoom lenses.

The invention is based on the discovery that the front real image forming group, sometimes used for focusing or trimming, and if desired, the second or magnification controlling (zooming) group can be simplified and implemented with two elements, rather than with separate groups having three or more elements each, through the use of diffractive optics on a curved surface of one of the lens elements of the group by providing, with the diffractive optics, substantially the same aberrations as those of the conventional group which it replaces; the aberrations remaining constant over the zoom range when taken in combination with the aberrations of the second, magnification controlling group. The performance of the lens in terms of sharpness over the field at the image plane and aberrations, both chromatic and monochromatic, is comparable with conventional zoom lenses even though the improved zoom lenses are less bulky, more compact and less expensive to manufacture.

BACKGROUND

Zoom lenses having magnification ratios larger than three times (3×) to twelve times (3×–12×) with F/#'s that remain substantially constant and faster than F/2.0 over the zooming range, which are especially suitable for small format applications, such as 8 mm movie cameras, video cameras and video recording equipment (camcorders) may be characterized as having at least three lens groups, these are a positive front group that can be used for focusing, followed by a negative power controlling or zooming group, then possibly followed by another intermediate group which provides a focusing trimmer to keep the focal or image plane at the same position over the zooming range, then followed, in some cases, by an aperture stop which may vary in size over the zooming range to maintain the F/# constant and finally by a back group, which is a multi-element group, usually fixed for removing the aberrations introduced by the first and second and possible third group, which remain essentially constant over the zooming range.

The front group has positive power and usually contains three elements, namely a negative meniscus cemented to a positive biconvex lens forming a doublet and a third meniscus positive element. In some cases, the negative element is uncemented or the third meniscus is split into two lenses. The second group, which varies magnification, usually has a negative element followed by a negative doublet including a biconcave element cemented to a convex element.

The foregoing design is the subject matter of a multiplicity of patents, an early one of which was issued to A. Cox et al., U.S. Pat. No. 3,044,355 on Jul. 17, 1962. Another was issued to L. R. Estelle, U.S. Pat. No. 4,934,795 on Jun. 19, 1990 and still another was issued to Y. Sugi et al., U.S. Pat. No. 5,301,064 on Apr. 5, 1994.

In U.S. Pat. No. 5,268,790, issued to C. W. Chen on Dec. 7, 1993, a zoom lens of the same general type as in the Cox and other patents mentioned above, was proposed containing diffractive optical elements on the generally plano surfaces of elements in the second group and in the third or trimming group. Such refractive/diffractive or hybrid optical elements, as well as the design thereof, is described in the technical literature, for example, D. A. Buralli et al., U.S. Pat. No. 5,013,133 issued May 7, 1991.

The incorporation of diffractive optics has heretofore required redesign of the entire zoom lens and the performance in terms of sharpness of the image over the entire image or focal plane and the absence of chromatic and monochromatic aberrations has not, without great difficulty in the design, produced a lens with hybrid optical elements having the performance of the multiple element all refractive zoom lenses.

SUMMARY OF THE INVENTION

It has been discovered in accordance with the invention that a zoom lens of the type having the design characterized above, can be implemented with diffractive optics in the first group and if desired, also in the second group without substantially affecting the design of the other elements of the lens while simplifying the overall lens and reducing its bulkiness, due to the incorporation of diffractive optics, by providing with the diffractive optics and a refracting element in the same group the same aberrations as produced by the all refracting element group. More particularly, the diffractive optics may be provided by a zone structure of blazed annular grating lines on a curved surface of a refracting element such that the aberrations of the combination of elements mimics (is substantially identical to) the aberrations of the all refractive element group. The diffractive optic, (sometimes called a diffractive optical element or DOE) is disposed on the curved surface of one of two refracting elements in the first group. A third element which may be part of an expensive cemented doublet is eliminated. Nevertheless, over the zooming range, aberrations remain the same and the design of the other optical elements in the other groups need not be substantially altered in order to incorporate the DOE. Similarly, a DOE may be located on a curved surface of a refractive element in the second magnification controlling or zooming group, also replacing a cemented doublet, and also mimicking the aberrations of an all refractive three-element magnification control group. Both the front and second or magnification control groups present to the remaining groups of the lens the same aberrations in the images relayed thereto. Thus, the performance of the overall zoom lens is comparable to an all refractive lens having more elements and the design of the remaining lenses need not be substantially altered.

Accordingly, it is the principal object of the present invention to provide improved zoom lenses incorporating diffractive optics.

It is another object of the present invention to provide improved zoom lenses with diffractive optics in the front group of the lens which faces the object, alone or together with a diffractive element in the group following the front group which moves to change the magnification provided by the zoom lens, wherein the design of the lenses following the second group need not be substantially altered in order to maintain the performance of the lens with diffractive optical elements comparable to the performance of an all refractive zoom lens.

It is a still further object of the invention to provide a zoom lens with three of more groups which has a magnification ratio range of at least three to one which can be extended to 12 to one and which uses diffractive optical elements in the front and/or the magnification varying second group which mimic the performance of all refractive optics in the front and second groups.

It is a still further object of the present invention to provide improved zoom lenses with diffractive optical elements suitable for small format imaging applications over a zooming range with magnifications of at least three times and extending to 12 times and an F/# which does not exceed 2.0 over the range, the diffractive optical elements being included in the first group and if desired, the second group, to obtain performance comparable to an all refractive zoom lens without substantial change in the design of the lenses of the groups between the magnification control group and the focal or image plane of the overall zoom lens.

The invention includes the attainment of one or more but not necessarily all of the foregoing objects.

Briefly described, the invention provides a zoom lens having at least first, second and third groups disposed successively along an optical axis between an object side and an image side, where the image of the object is focused at an image plane. Aberrations due to the first and second group remain substantially constant over the zoom range and are substantially corrected at the image plane by the third group. The third group has a negative element and other elements disposed successively along the axis in a direction from the object side to the image side. The first group has only two elements, which are a first and a second positive element each having at least one curved surface. A positive diffractive focusing element is located on the curved surface of one of the two positive elements. The first group provides with the second group, substantially the same aberrations over the zooming range as a group having a negative meniscus element, a positive biconvex element and a positive meniscus. In accordance with a second aspect of the invention, the second group may be replaced by a group having two negative elements each having at least one curved surface. A diffractive focusing element is located on a curved surface of one of the first and second elements of the second group and provides along with the first group, substantially the same aberrations over the zooming range as the second group having a negative refracting element and a negative doublet which is also a refracting element.

BRIEF DESCRIPTION OF THE DRAWINGS

The foregoing and other objects, features and advantages of the invention as well as presently preferred embodiments thereof will become more apparent from a reading of the following description in connection with the accompanying drawings.

FIGS. 6A to 6I are plots illustrating the performance of the lens shown in FIG. 6.

DETAILED DESCRIPTION

Figure 1:
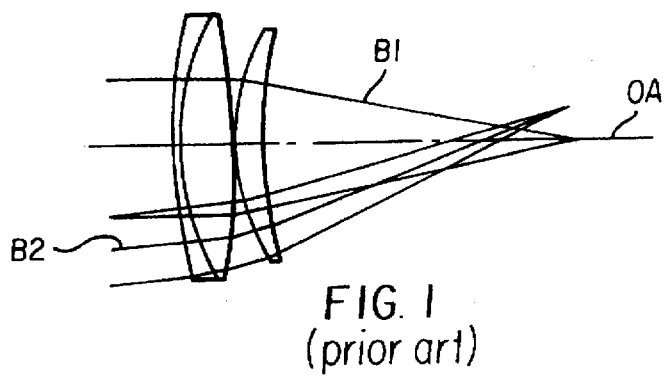
FIG. 1 is a schematic diagram of the optical elements of the front or first group of a conventional zoom lens having an all refractive front group.
Figure 2:
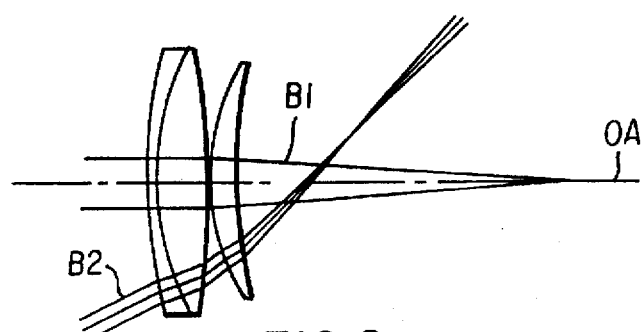
FIG. 2 is a schematic ray diagram of the lens group shown in FIG. 1 when the zoom lens is in the shortest focal length lowest magnification end of its range.
Figure 3:
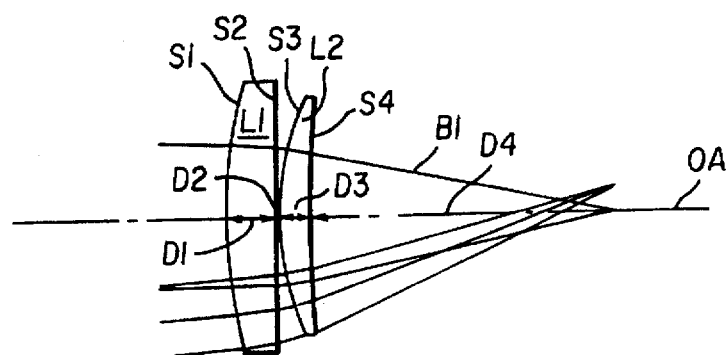
FIG. 3 is a schematic ray diagram illustrating a front or first group lens embodying the invention, which has a diffractive focusing element on the first or front surface thereof which faces the object side of the lens.
Figure 3A:
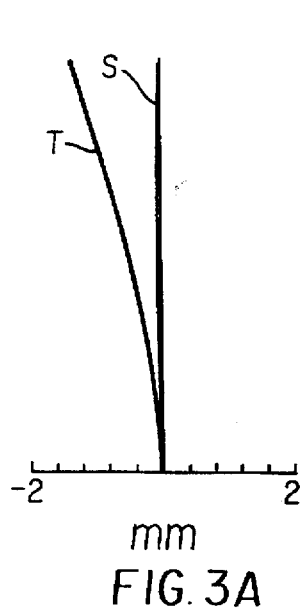
FIGS. 3A to 3I are plots illustrating the performance of the lens illustrated in FIG. 3 at the long focal length and high magnification end of its range.
Figure 3B:
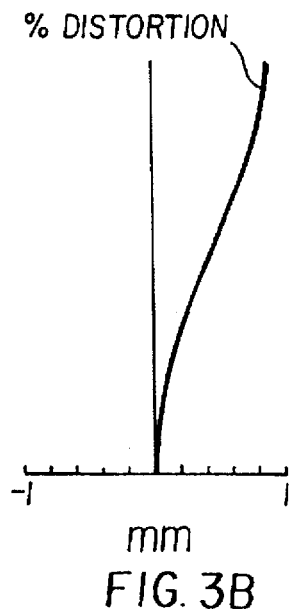
Figure 3C:
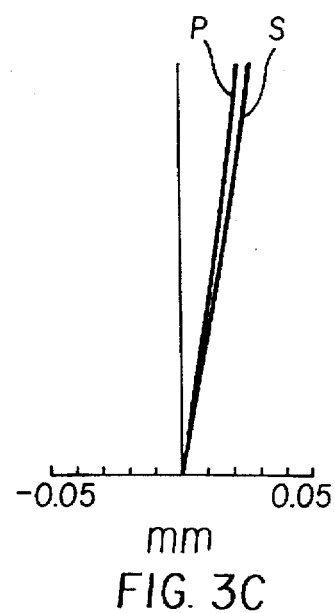
Figure 3D:
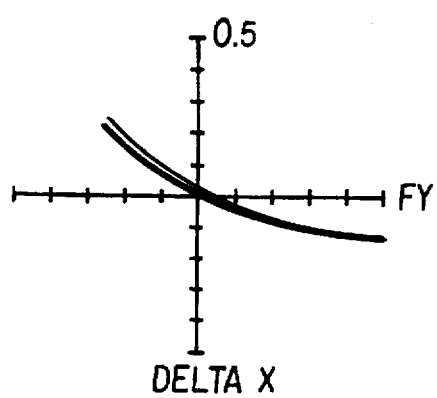
Figure 3E:
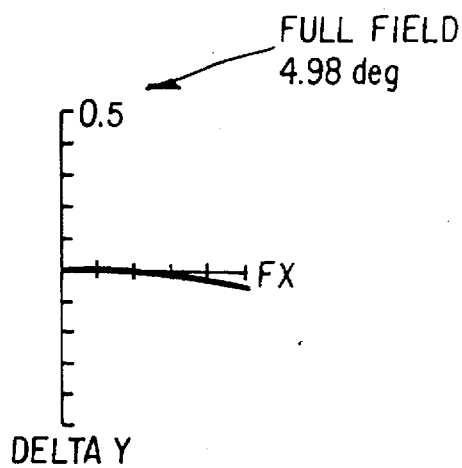
Figure 3F:
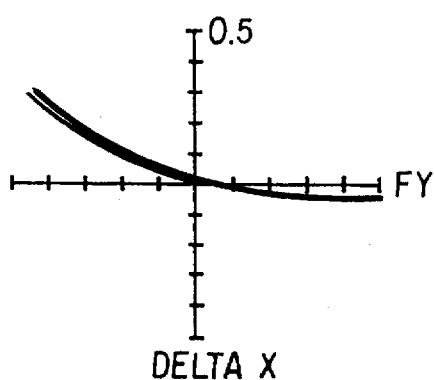
Figure 3G:
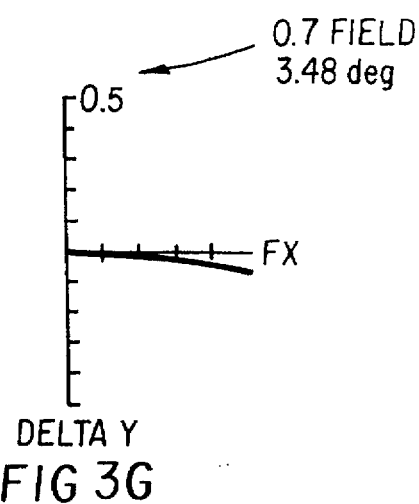
Figure 3H:
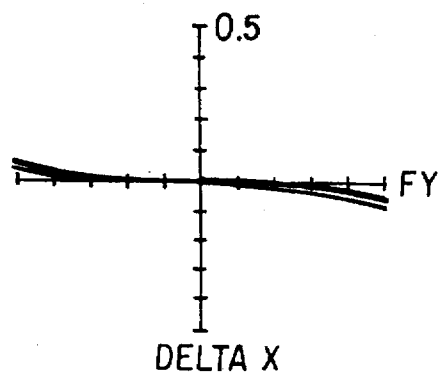
Figure 3I:
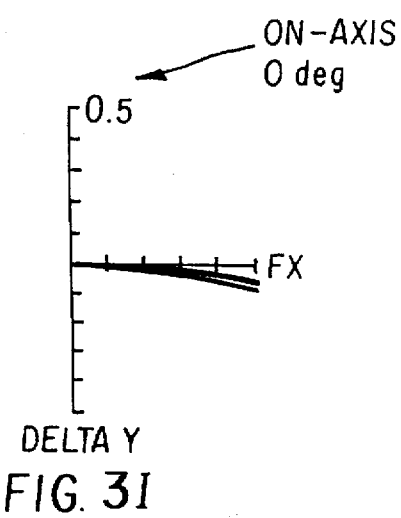
Figure 4:
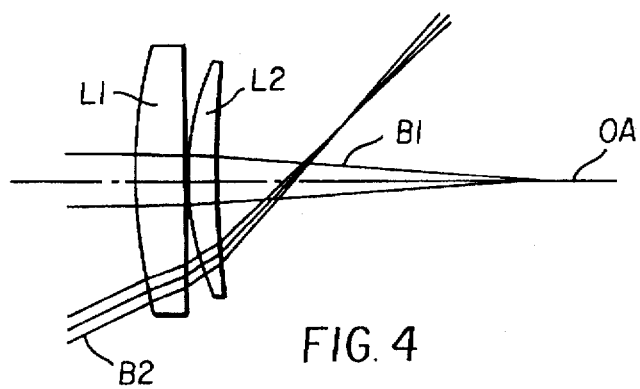
FIG. 4 is a schematic ray diagram of the front lens group illustrated in FIG. 3, but at the low magnification and short focal length end of the zooming range of the zoom lens.
Figure 4A:
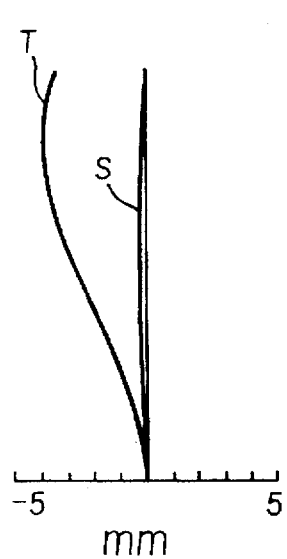
FIGS. 4A to 4I are plots illustrating the performance of the lens shown in FIG. 4 at the short focal length, low magnification end of the zooming range.
Figure 4B:
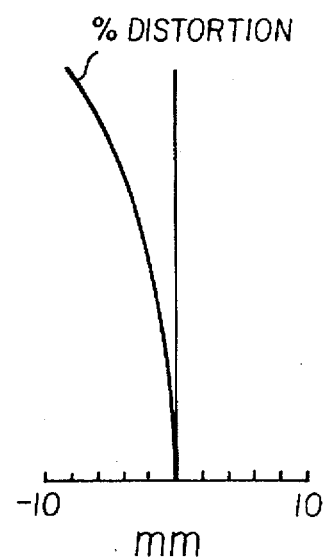
Figure 4C:
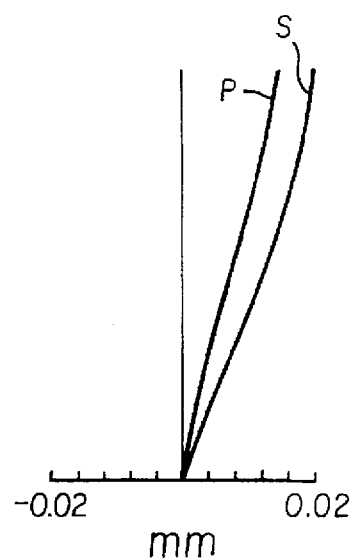
Figure 4D:
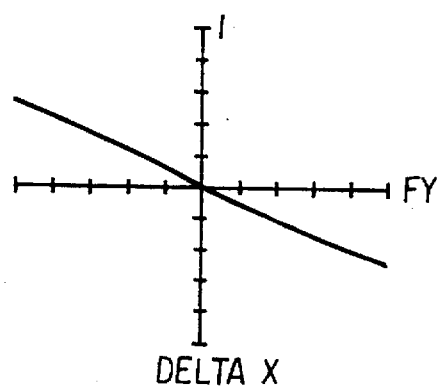
Figure 4E:
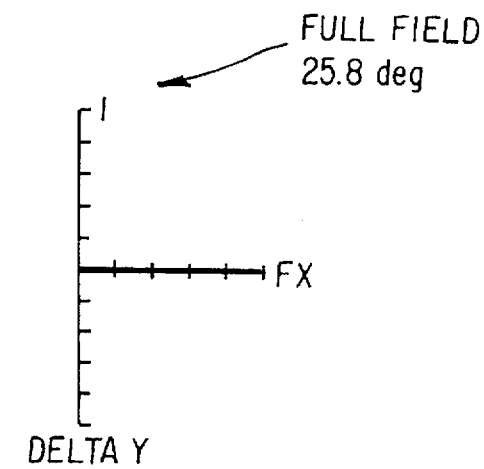
Figure 4F:
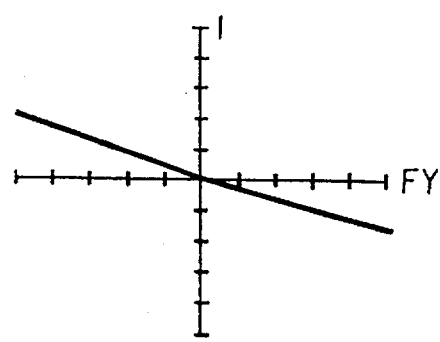
Figure 4G:
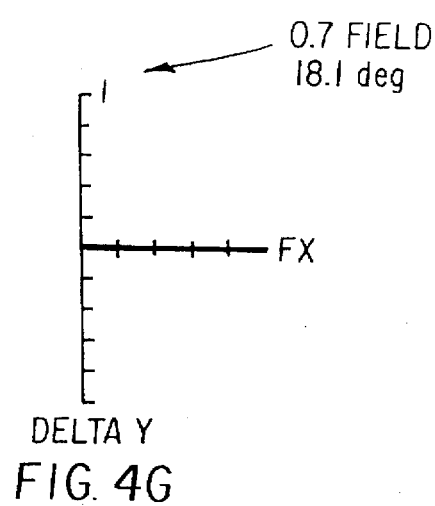
Figure 4H:
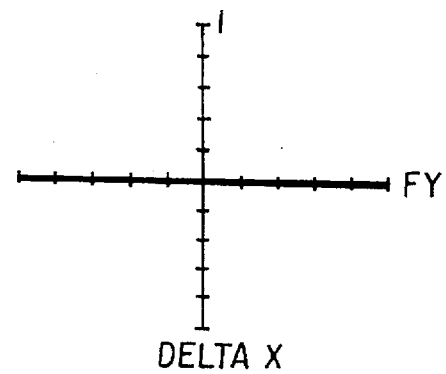
Figure 4I:
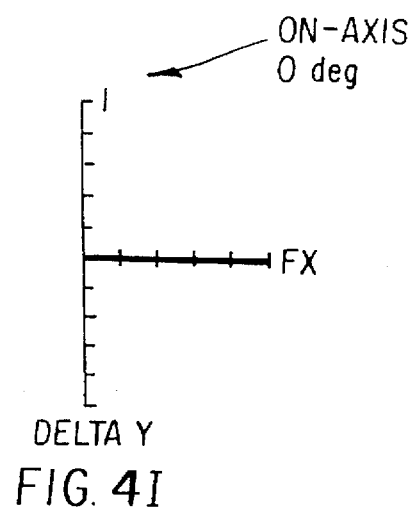

The invention is presented by considering a conventional zoom lens system in which the front or first group has a hybrid refractive/diffractive lens element enabling it to be implemented with two elements, namely L1 and L2 as shown in FIGS. 3 and 4 instead of 3 elements, including a cemented doublet and meniscus, all of which are refractive. Such a conventional front group is shown in FIGS. 1 and 2. The conventional front group is, for purposes of example, the front group of the zoom lens of U.S. Pat. No. 5,301,064, which is referenced above.

The conventional front group is characterized in terms of its aberrations in the telephoto or long focal length position thereof as shown in FIG. 1 which is at one end of the zooming range, and in its short or wide angle position at the opposite end of the zooming range, as shown in FIG. 2. The bundles of rays which enter axially either parallel to the optical axis or from a point on the optical axis of the lens (OA) and the extra-axial tilted rays are shown in two ray bundles B1 and B2 in FIGS. 1 and 2.

Figure 1A:
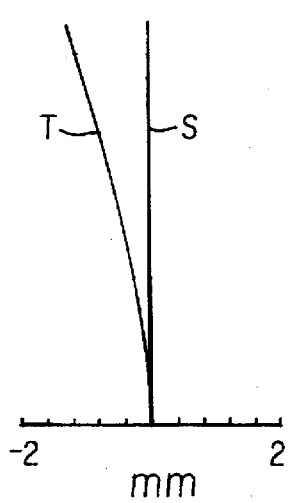
FIGS. 1A through 1I are curves illustrating the performance in terms of aberrations and sharpness of the lens group illustrated in FIG. 1. When the zoom lens incorporating the first lens group is in the high magnification—longest focal length end of its zooming range.
Figure 1B:
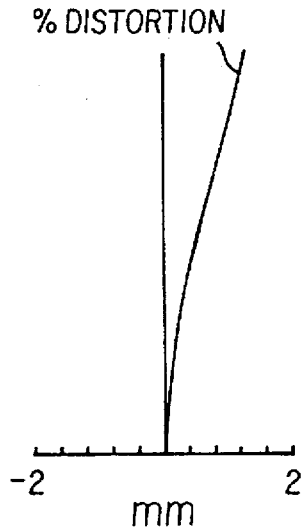
Figure 1C:
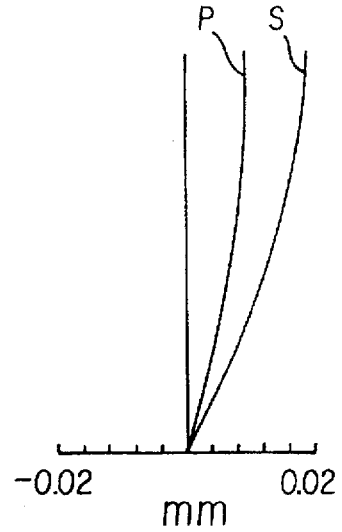
Figure 1D:
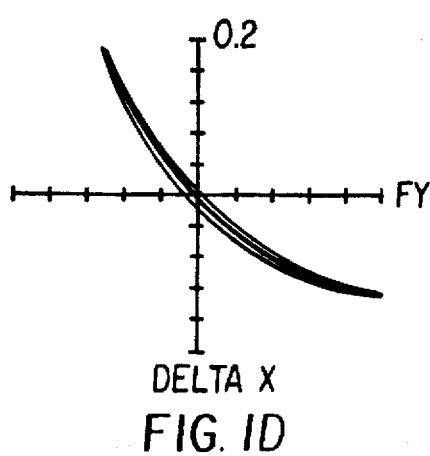
Figure 1E:
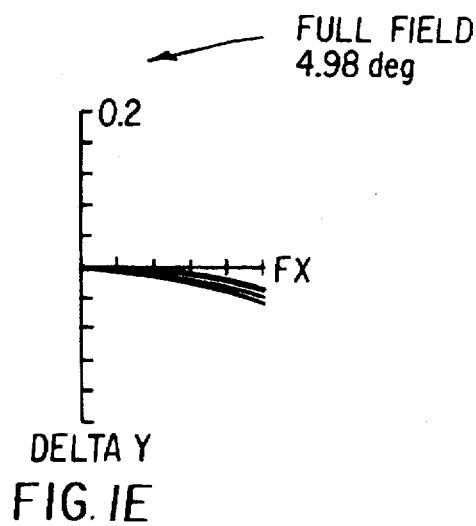
Figure 1F:
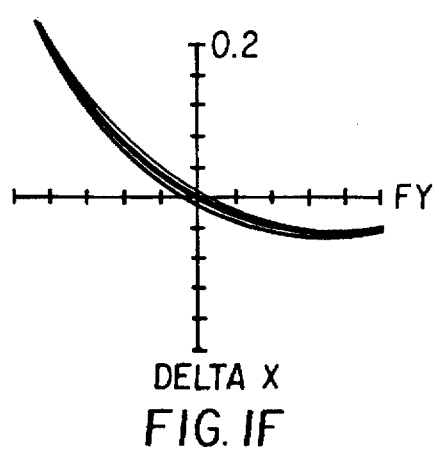
Figure 1G:
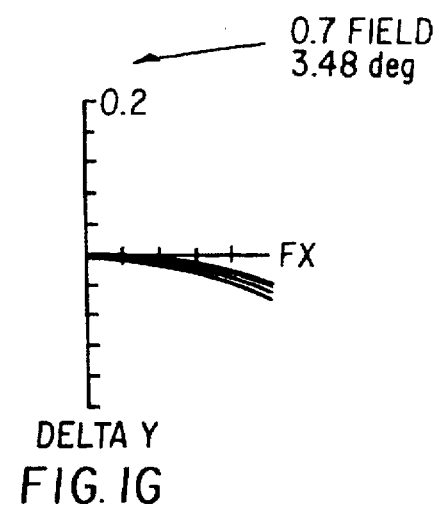
Figure 1H:
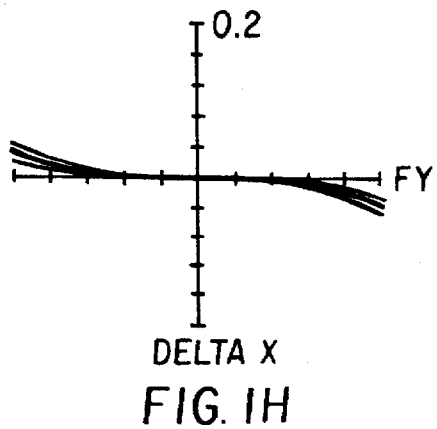
Figure 1I:
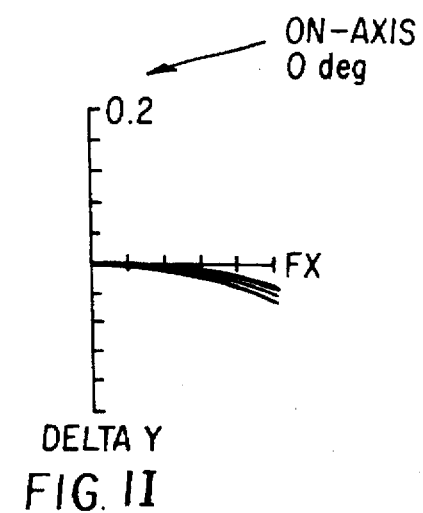
Figure 2A:
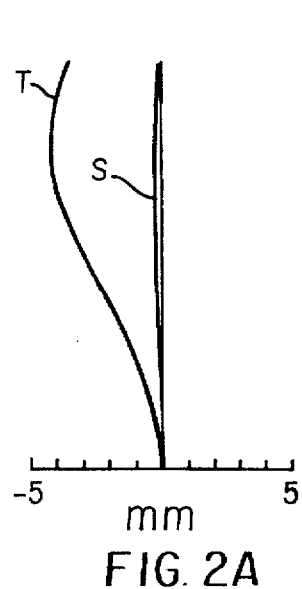
FIGS. 2A to 2I are plots illustrating the performance of the lens shown in FIG. 2 at the short focal length and low magnification end of the range.
Figure 2B:
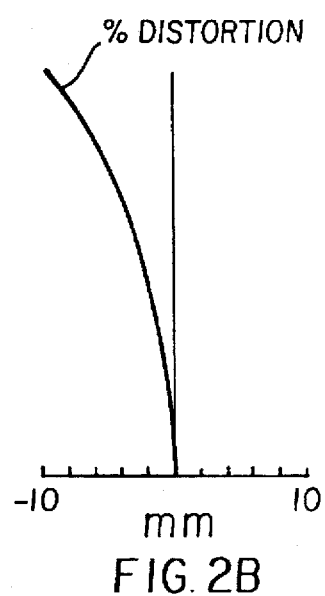
Figure 2C:
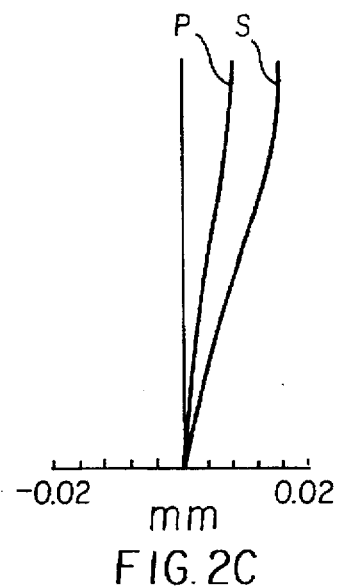
Figure 2D:
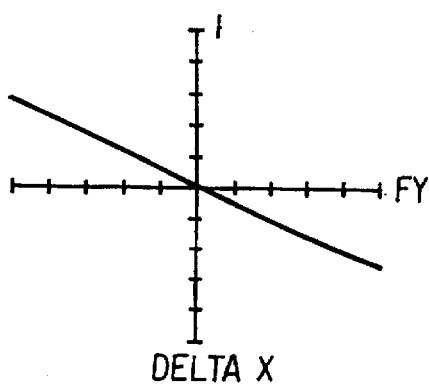
Figure 2E:
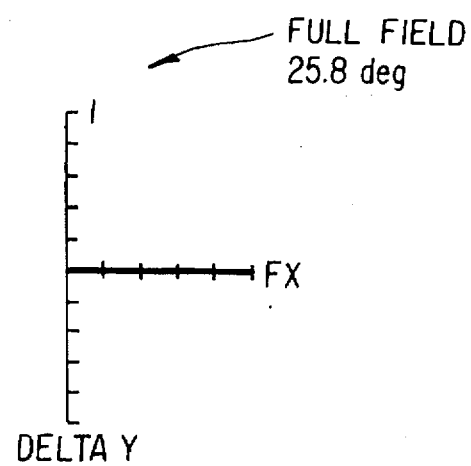
Figure 2F:
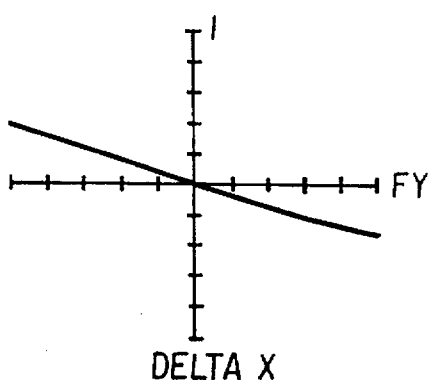
Figure 2G:
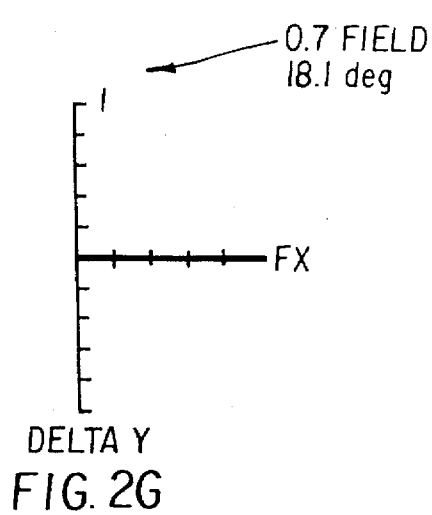
Figure 2H:
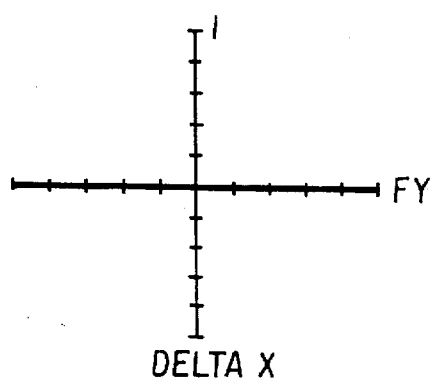
Figure 2I:
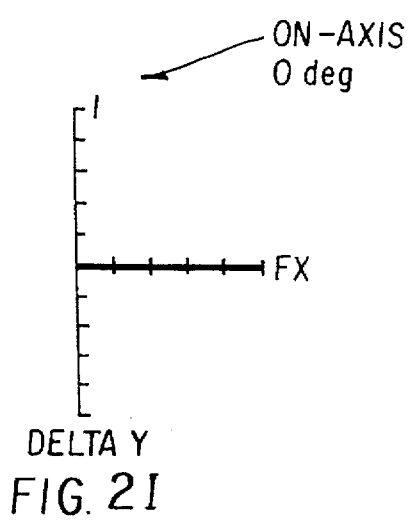

The astigmatism with respect to the field height in the sagittal direction S and in the tangential direction T in the focal plane of the lens group shown in FIGS. 1 and 2 in increments of 0.4 mm is shown in FIGS. 1A and 2A. The percent distortion in the same plane is shown in FIGS. 1B and 2B. Lateral color aberration in increments of 0.025 mm for the P (blue minus red) and for the S (red minus green) chromatic characteristics are shown in FIGS. 1C and 2C. In these curves, blue is 486 nm, green is 588 nm, and red is 656 nm. The rim-ray curves at maximum field coverage, 0.7 of the field and on axis are shown in the family of curves of FIGS. 1D through 1I. FY is a tangential fan and FX is a sagittal fan. Corresponding FIGS. 2A, 2B, 2C and 2D through 2I also characterize the monochromatic and chromatic aberrations and performance of the first group lens in the wide angle position.

The improved front lens group is shown in FIGS. 3 and 4. As labeled in FIG. 3, there are two lenses L1 and L2. L1 is a biconvex lens and L2 is a meniscus. Both lenses have positive power. S1, the front surface of L1, contains a DOE provided by zones formed by annular lines which are blazed. An exemplary design of the lens shown in FIGS. 3 and 4 is given in Chart 1 below. The aberrations and performance in the long focal length or telephoto position are characterized in FIGS. 3A through 3I which are counterparts of FIGS. 1A through 1I. Similarly, the aberrations and performance of the lens group in the wide angle position shown in FIG. 4, is characterized by the curves of FIGS. 4A through 4I which are counterparts of FIGS. 2A through 2I. It will be readily apparent from the corresponding curves or plots that the performance of the two element lens group with the hybrid refractive/diffractive element L1, is substantially identical to the performance of the 3-element lens group of the conventional zoom lens. Therefore, the lens groups are directly interchangeable and none of the lenses of the other groups which follow the front group need be modified substantially.

CHART 1

| Radius mm | Phase | Axial Thickness mm | Material n:v |
|---|---|---|---|
| 51.8744 (S1) | $\phi(r) = \Sigma \frac{2\pi}{\lambda_0} (C_i r^{2i})$ $\lambda = 587.56$ nm $r = 0$ to 13.85 mm $C_1 = -5.7191e-4$ $C_2 = -5.3133e-8$ $C_3 = -9.8725e-12$ $C_4 = -2.2930e-15$ $C_5 = -5.9647e-19$ | 5.230 (D1) | 1.589:61.2 |
| −1223.959 (S2) | | 0.200 (D2) | Air |
| 27.4626 (S3) | | 2.770 (D3) | 1.589:61.2 |
| 89.1648 (S4) | | 9.992 (D4) (to back focus) | |

Figure 5:
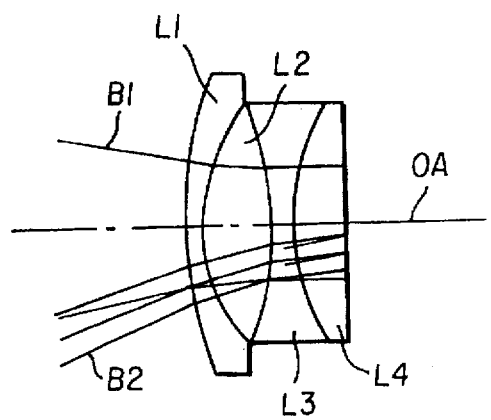
FIG. 5 is a schematic ray diagram of a second lens group of a conventional zoom lens.
Figure 5A:
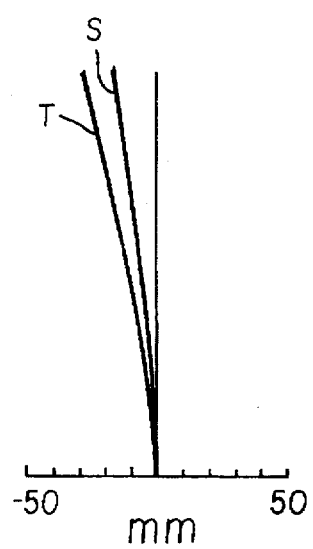
FIGS. 5A to 5I are plots illustrating the performance of the lens shown in FIG. 5 at the long focal length and high magnification end of the zooming range of the lens.
Figure 5B:
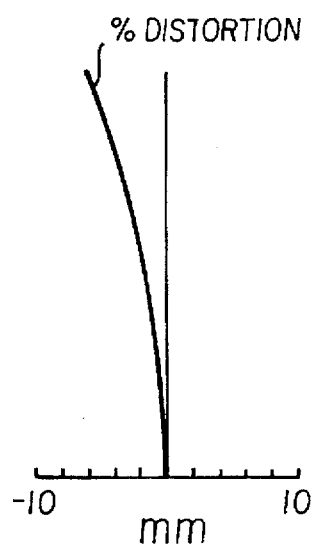
Figure 5C:
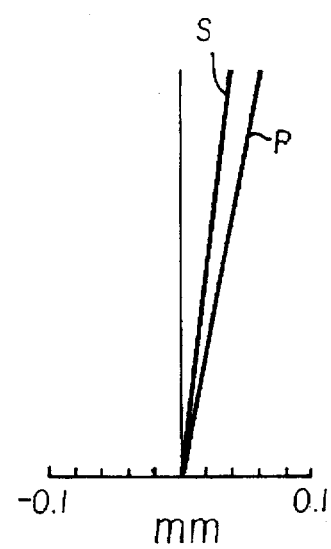
Figure 5D:
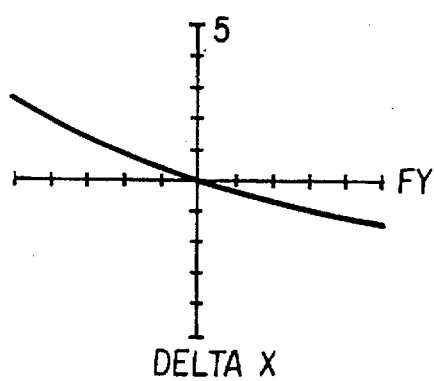
Figure 5E:
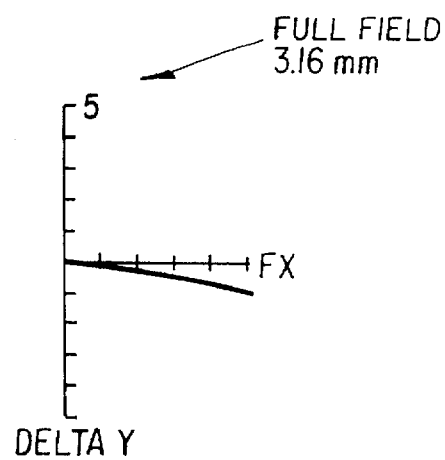
Figure 5F:
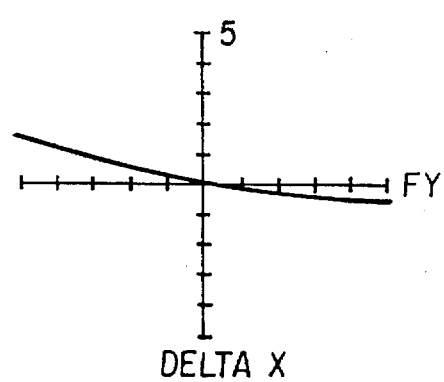
Figure 5G:
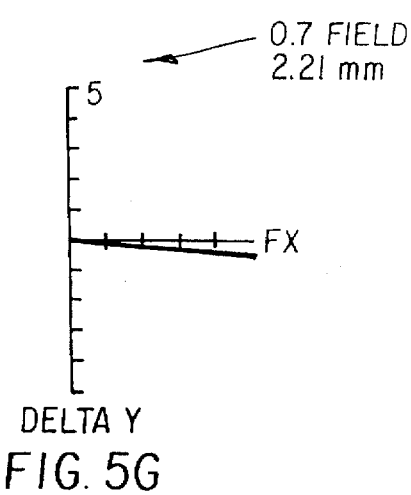
Figure 5H:
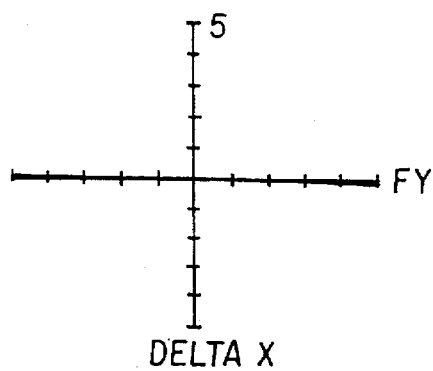
Figure 5I:
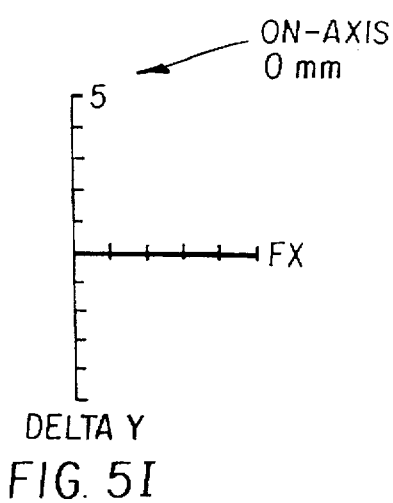

Consider next a conventional second or magnification control group of a conventional zoom lens, and particularly a lens of U.S. Pat. No. 5,301,064. Such a lens has a meniscus element L1 followed by a cemented doublet L2, consisting of a bi-concave lens L3 and a plano convex element L4. The performance of this lens in the wide angle position at the long and short end of its zooming range is shown in FIGS. 4 and 5, respectively. Curves characterizing the aberrations and performance of the lens, which are similar to those of FIGS. 1A through 1I, are shown in FIGS. 4A through 4I. Similarly the performance of the conventional second group in the wide angle position is characterized by curves of FIGS. 5A through 5I which are similar to the wide angle curves of FIGS. 2A to 2I. In all of these curves the scale is in millimeters as indicated thereon. The calibration is in fractions of the maximum millimeter value indicated at the end of the scale.

Figure 7:
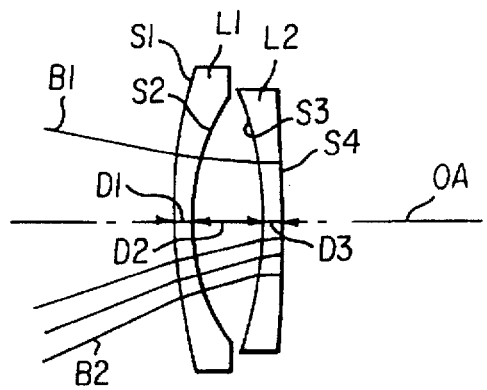
FIG. 7 is a schematic ray diagram of a second group of lenses of a zoom lens; the second group having diffractive optics in accordance with the present invention.
Figures 7A, 7B, 7C:
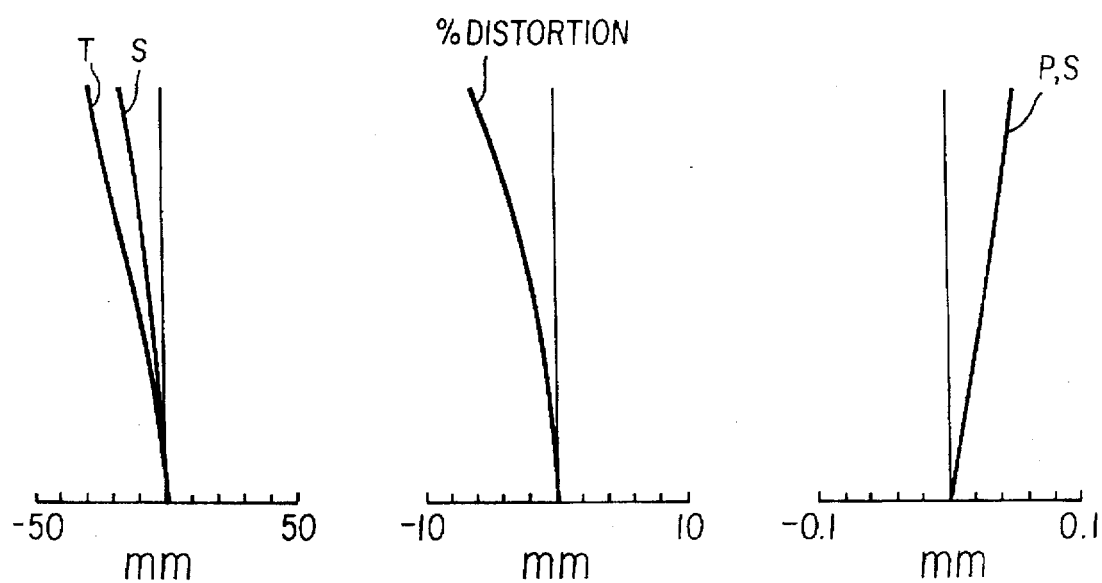
FIGS. 7A through 7I are plots illustrating the performance, of the lens group shown in FIG. 7 at the long focal length high magnification end of the range of the zoom lens in which the second group shown in FIG. 7 is employed.
Figure 7D:
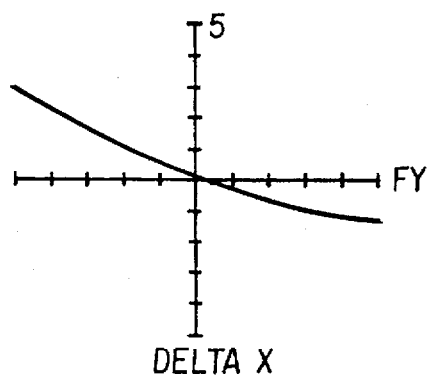
Figure 7E:
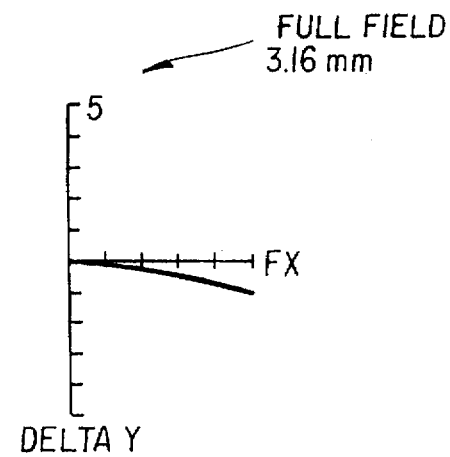
Figure 7F:
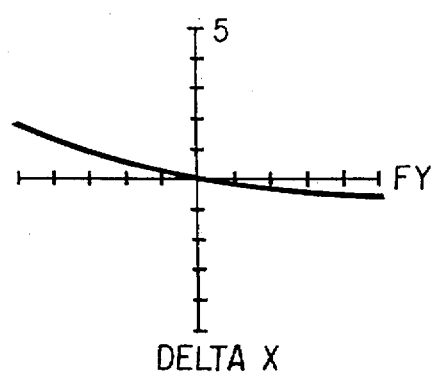
Figure 7G:
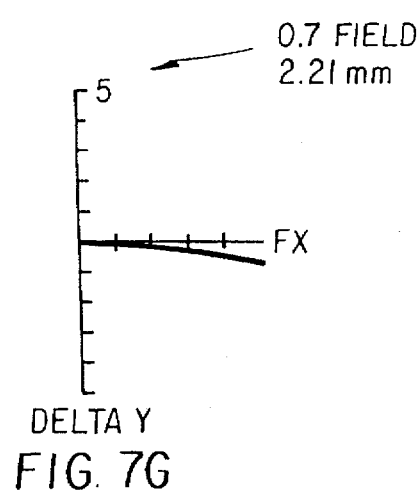
Figure 7H:
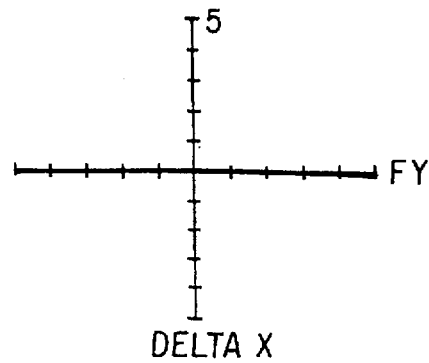
Figure 7I:
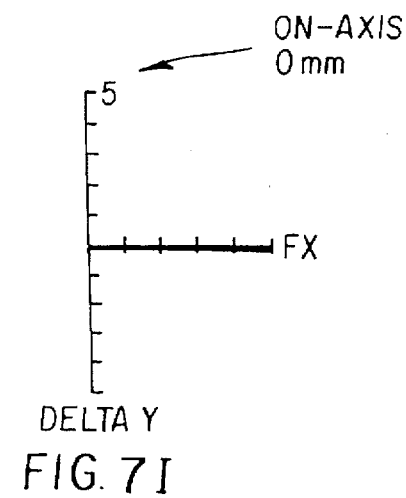
Figure 8:
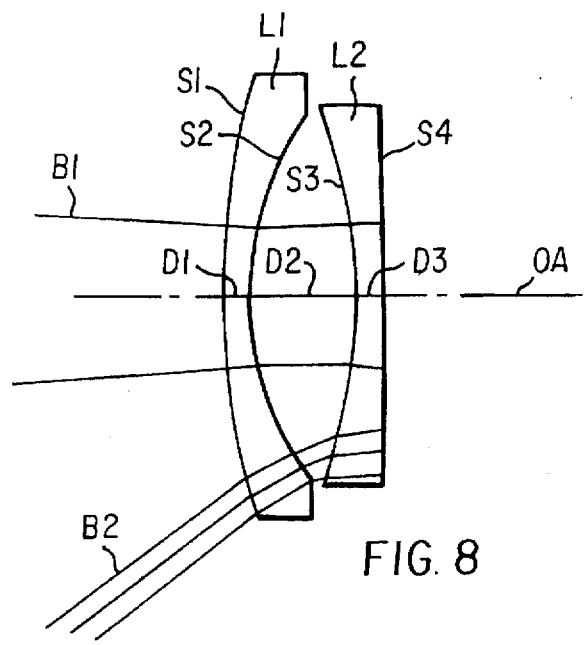
FIG. 8 is a ray diagram of the second lens group shown in FIG. 7, but at the low magnification and short focal length end of the range of the zoom lens.
Figure 8A:
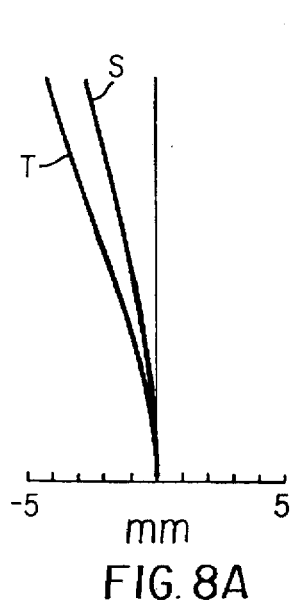
FIGS. 8A through 8I are plots illustrating the performance of the second group lens illustrated in FIG. 8.
Figure 8B:
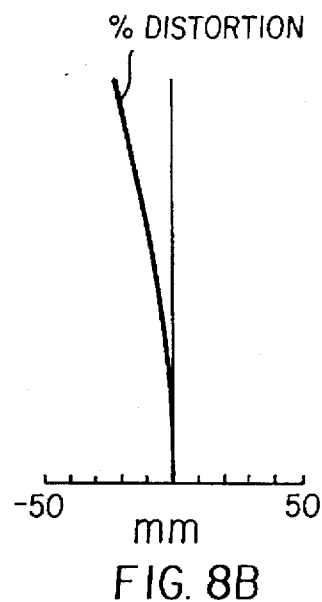
Figure 8C:
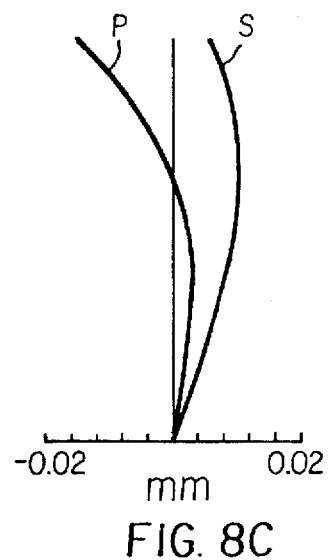
Figure 8D:
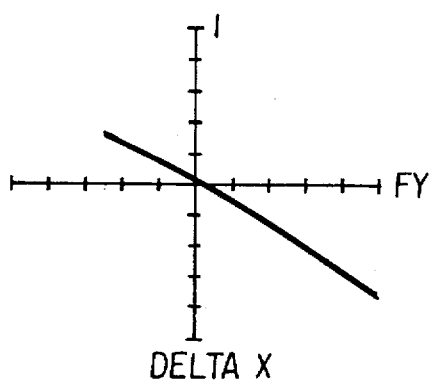
Figure 8E:
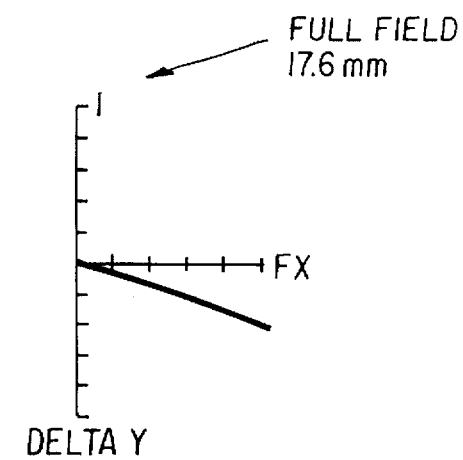
Figure 8F:
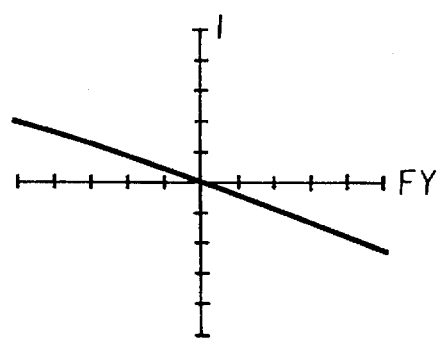
Figure 8G:
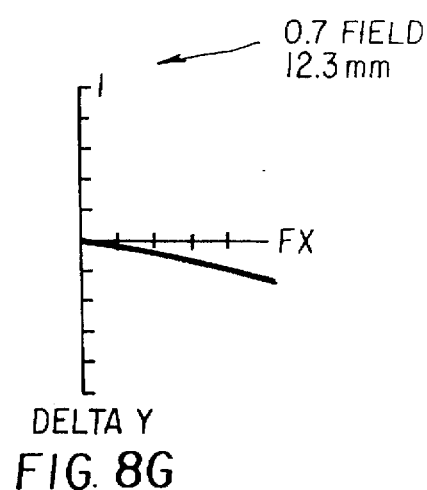
Figure 8H:
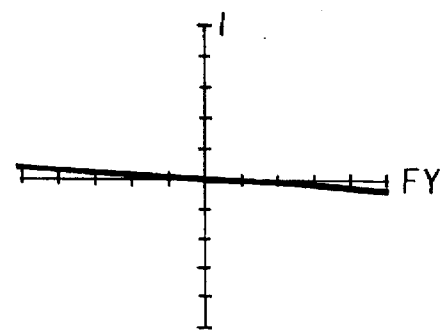
Figure 8I:
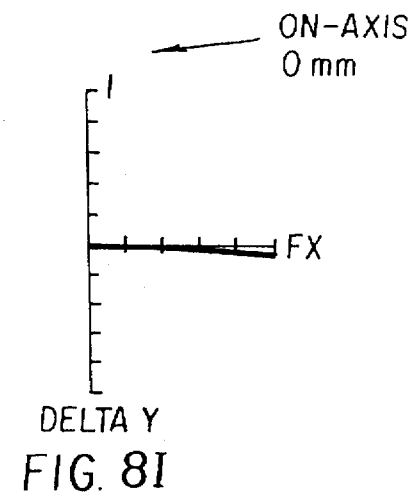

The second group lens which is provided in accordance with the invention is illustrated in long focal length or telephoto position in FIG. 7 its short focal length wide angle position in FIG. 8. This lens consists only of a meniscus L1 and a concave-convex singlet L2. The surface S3 is concave and the surface S4 is convex, but with much less curvature than in the case for the concave surface S3. L4 in a hybrid refractive/diffractive singlet. The diffractive optical element on its surface S3 which is in the form of annular zones defined by annular, circular rings about the optical axis. The group shown in FIGS. 7 and 8 has negative power and moves along the optical axis OA with respect to the first group as described in the U.S. Pat. No. 5,301,064 patent.

Figure 6:
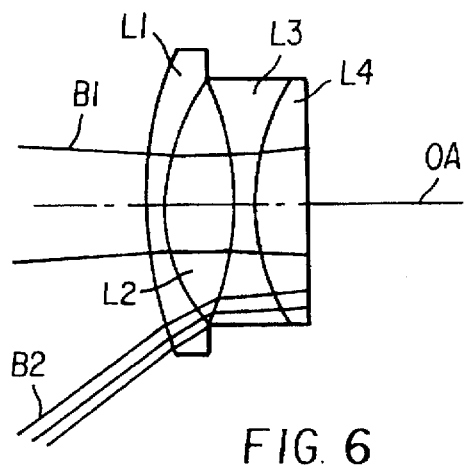
FIG. 6 is a schematic diagram of the lens group shown in FIG. 5 at the low magnification short focal length end of the zooming range of the zoom lens.
Figure 6A:
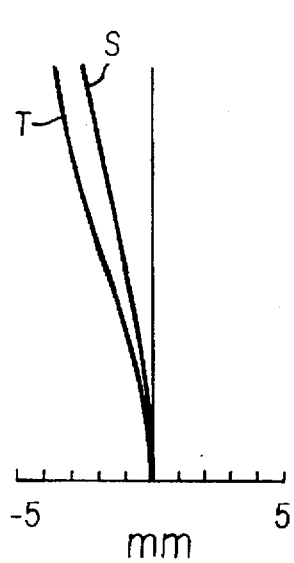
Figure 6B:
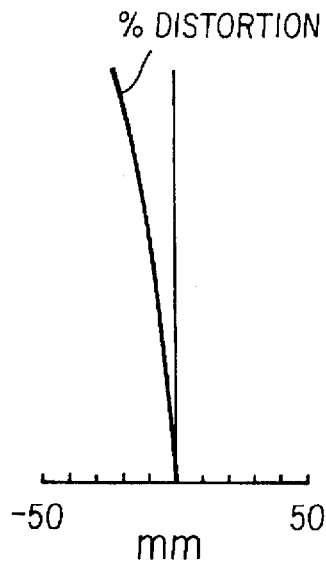
Figure 6C:
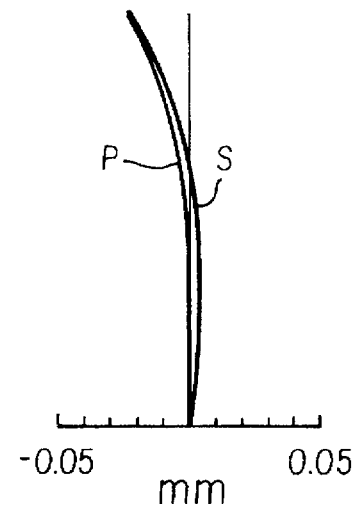

A specific example of a design of the second group is given below in Chart 2. For this design a family of curves for the telephoto, long focal length position of the lens group, comparable to curves in FIGS. 5A to 5I, shows that the aberrations and performance of the group having the DOE has aberration and performance characteristics which are substantially identical to the conventional three element second group. Similarly for the wide angle short focal end of the zooming range, the curves shown in FIGS. 8A through 8I are substantially identical to the curves in FIGS. 6A through 6I. The performance of the second lens group of FIGS. 7 and 8 which has a DOE on surface S3 therefore mimics the performance of the conventional second magnification control lens group as shown in FIGS. 5 and 6 and may replace that group without affecting the design of the rest of the lens.

CHART 2

| Radius mm | Phase | Axial Thickness mm | Material n:v |
|---|---|---|---|
| 24.1629 (S1) | | 0.855 (D1) | 1.743:49.3 |
| 9.9345 (S2) | | 3.332 (D2) | Air |
| 16.3564 (S3) | $\phi(r) = \Sigma \frac{2\pi}{\lambda_0} (C_i r^{2i})$ $\lambda = 587.56$ nm $r = 0$ to 6.0 mm $C_1 = -3.0167e-3$ $C_2 = -2.8190e-6$ $C_3 = -5.2685e-9$ $C_4 = -1.2308e-11$ $C_5 = -3.2204e-14$ | 0.850 (D3) | 1.743:49.3 |
| −99.5402 (S4) | | −18.927 (D4) (to back focus) | Air |

In accordance with a feature of the invention, the first lens group may be replaced by a group having a DOE on a curved surface thereof, such as shown in FIGS. 3 and 4, thereby saving one lens and eliminating the need for a cemented doublet. When the second lens group is also replaced, now with a lens group such as shown in FIGS. 7 and 8, which also has a DOE on a curved surface thereof, a lens element is eliminated and a cemented doublet is not required. With regard to the first and second lens group shown in FIGS. 7 and 8, while the use of the front surface S(1) of the first lens (L1) of the first group S3 of the second lens L2 of the second group is presently preferred, any curved surface of (L1) or (L2) may be provided with a glazed annular ring grating DOE and obtain performance similar to that shown in connection with FIGS. 7A through 7I and 8A through 8I. Accordingly, by replacing both the focus control first or front lens group and the magnification control or second lens group of a multi-element zoom lens with lens groups having DOE's on a surface thereof, two lenses may be saved and cost of the zoom lens may be reduced without impacting adversely the performance of the zoom lens.

Figure 9:
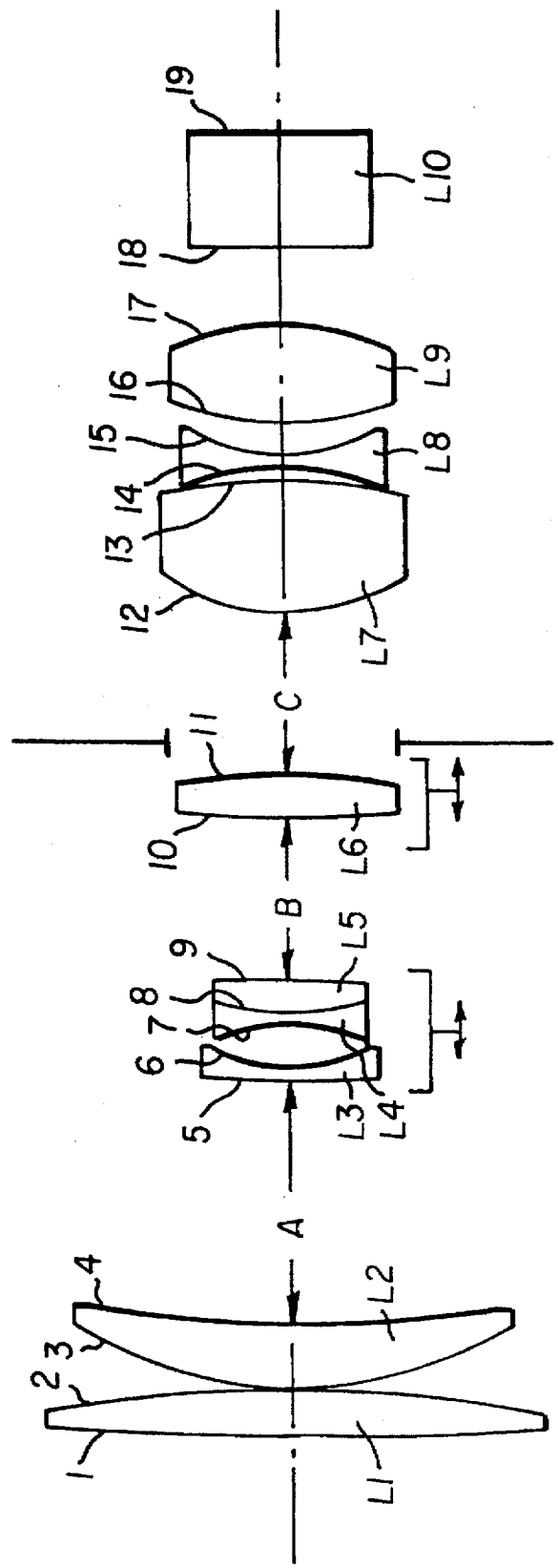
FIG. 9 is a schematic diagram of a zoom lens of the type illustrated in the above-reference Estelle U.S. Pat. No. 4,934,795 wherein the first group has on one of the curved surfaces of the lens elements thereof, a diffractive optical focusing element.

Referring to FIG. 9, there is shown a zoom lens which is illustrated and described in connection with FIG. 10 of U.S. Pat. No. 4,934,795. This lens has a front group consisting of a bi-convex element L1 and a concavo-convex or meniscus element L2. This lens group replaces a three-element group having a cemented doublet as shown in the U.S. Pat. No. 4,934,795 patent. None of the other lens groups which provide the surfaces 5 through 19, need be substantially altered. Of course the second lens group having surfaces 5 through 9 and a cemented doublet may be replaced with a lens group similar to the group shown in FIGS. 7 and 8.

Diffractive optical elements may be placed on any of the curved surfaces of the lenses L1 and L2 in the first lens group. Charts 3, 4 and 5 respectively contain examples of designs where the DOE is on the front (S1 or 1), second (S2 or 2) and third (S3 or 3) surfaces, respectively.

CHART 3

| Radius mm | Phase | Axial Thickness mm | Material n:v |
|---|---|---|---|
| DIFFRACTIVE 68.34069 (S1) (base curve) | $\phi(r) = \sum \frac{2\pi}{\lambda_o} C_i r^{2i}$ from $i=0$ to $i=5$ <br> $\lambda_o = 588$ nm <br> $C_1 = -5.9891441 \times 10^{-4}$ <br> $C_2 = -2.7682385655 \times 10^{-8}$ <br> $C_3 = 1.724845648 \times 10^{-11}$ <br> $C_4 = -6.938193599 \times 10^{-14}$ <br> $C_5 = 0$ | 3.742 (D1) <br> Blaze (Peak to Valley) = ? | 1:516:64.1 (L1) |
| −284.717 (S2) | — | 0.10 (D2) | air |
| 30.1125 (S3) | — | 3.494 (D3) | 1.603:60.7 (L2) |
| 64.7687 (S4) |  | 45.67 (D4) <br> To back focus |  |

CHART 4

| Radius mm | Phase | Axial Thickness mm | Material n:v |
|---|---|---|---|
| 92.143 (S1) | — | 3.20 (D1) |  |
| 138.5483 (S2) (base curve) DIFFRACTIVE | $\phi(r) = \sum \frac{2\pi}{\lambda_o} C_i r^{2i}$ from $i=0$ to $i=5$ <br> $\lambda_o = 588$ nm <br> $C_1 = -7.203 \times 10^{-4}$ <br> $C_2 = 1.867 \times 10^{-7}$ <br> $C_3 = -1.7248 \times 10^{-11}$ <br> $C_4 = -6.9382 \times 10^{-14}$ <br> $C_5 = 0$ |  | 1.492:57.4 (L1) |
| 26.2481 (S3) | — | 0.10 (D2) | air |
| 64.8248 (S4) |  | 4.10 (D3) <br> 36.78 (D4) <br> To back focus | 1.603:60.7 (L2) |

CHART 5

| Radius mm | Phase | Axial Thickness mm | Material n:v |
|---|---|---|---|
| 255.467 (S1) | — | 3.20 (D1) | 1.492:57.4 (L1) |
| −81.0291 (S2) | — | 0.1 (D2) | Air |
| 27.7693 (S3) (Base curve DIFFRACTIVE | $\phi(r) = \sum \frac{2\pi}{\lambda_o} C_i r^{2i}$ from $i=0$ to $i=5$ <br> $\lambda_o = 588$ nm <br> $C_1 = -7.304349258 \times 10^{-4}$ <br> $C_2 = 1.831137931 \times 10^{-7}$ <br> $C_3 = -1.7248 \times 10^{-11}$ <br> $C_4 = -6.938 \times 10^{-14}$ <br> $C_5 = 0$ | 4.10 (d3) | 1.603:60.7 (L2) |
| 81.2386 (S4) | — | 38.73 (D4) <br> to back focus | — |

By way of further example, Chart 6 which is given below describes still another design where the DOE is on surface 1, the front surface of the first or focusing lens group as shown in FIG. 9. The design of the lenses of the other groups are also indicated for the sake of completeness. The first lens group mimics the performance, including the aberrations of the three-element lens group shown in FIG. 10 of the referenced U.S. Pat. No. 4,934,795 and therefore does not require redesign of the other lens groups thereof in order to be compatible therewith.

CHART 6

| SURF. | RADIUS mm | THICKNESS mm | GLASS N:υ |
|---|---|---|---|
| 1 | DIFFRACTIVE | 3.742 | 1.516:64.1 |
| 2 | −284.717 | 0.100 | |
| 3 | 30.1125 | 3.494 | 1.603:60.7 |
| 4 | 64.7687 | A | |
| 5 | 39.3391 | 0.900 | 1.720:50.3 |
| 6 | 10.6065 | 3.624 | |
| 7 | ASPHERE | 0.600 | |
| 8 | 15.0759 | 2.172 | 1.847:23.8 |
| 9 | −413.708 | B | |
| 10 | 192.162 | 3.000 | 1.697:55.5 |
| 11 | −35.4624 | C | |
| 12 | 14.7610 | 8.800 | 1.806:40.9 |
| 13 | −30.6010 | 0.524 | |
| 14 | ASPHERE | 1.000 | |
| 15 | 11.2181 | 2.212 | |
| 16 | 19.3072 | 6.500 | 1.786:43.9 |
| 17 | −19.3072 | 5.000 | |
| 18 | PLANO | 7.500 | 1.516:64.1 |
| 19 | PLANO | | |

| EF | STOP DIAM. | A | B | C |
|---|---|---|---|---|
| 9.21 | 15.02 | 1.094 | 16.292 | 14.440 |
| 22.18 | 14.97 | 17.352 | 12.384 | 2.092 |
| 52.49 | 10.65 | 24.745 | 1.050 | 6.031 |

THE DIFFRACTIVE SURFACE
CAN BE DESCRIBED BY THE FOLLOWING:
PHASE EQUATION:

$$\phi(Y) = \frac{2\pi}{\lambda_o} (C_1 Y^2 + C_2 Y^4 + C_3 Y^6 + C_4 Y^8 + C_5 Y^{10})$$

SURFACE 1: $C_1 = -5.989144415e-04$  $C_3 = 1.724845684e-11$  $C_5 = 0.0$
$C_2 = 2.7682385655e-08$  $C_4 = -6.9381935997e-14$
$\lambda_o = 588$ NM  BASE RADIUS = 68.34069
where $e^x = 10^x$.

$$X = \frac{CY^2}{1 + \sqrt{1 - (1+k) C^2 Y^2}} + DY^4 + EY^6 + FY^8 + GY^{10}$$

X = SAGITAL & Y = TANGENTIAL or r as in equations above for $\phi(r)$
SURF. 7  $C = -0.0739563$  $D = -0.3607500e-04$  $F = 0.856744E-08$
$K = -0.9493000$  $E = -0.8503900e-06$  $G = 0.0000000E-00$
SURF. 14  $C = -0.0471049$  $D = -0.6046900E-04$  $F = -0.7503800E-08$
$k = 0.66950000$  $E = 0.1221300E-05$  $G = 0.5381400E-10$ From the foregoing description it will be apparent that there has been provided improved zoom lenses having advantages arising from the use of DOE's without disadvantages of requiring redesign of the entire lens in order to obtain performance comparable to zoom lenses of the conventional type having additional lens elements. Variations and modifications in the herein described lenses, in accordance with the invention, will undoubtedly suggest themselves to those skilled in the art. Accordingly, the foregoing description should be taken as illustrative and not in a limiting sense.

What is claimed is:

1. In a zoom lens having at least first, second and third groups disposed successively along an optical axis between an object side and an image side where an image of an object is focussed at an image plane with a zoom magnification ratio range of at least 3× and aberrations due to said first and second groups remain substantially constant over said zoom range and are substantially corrected at said image plane by said third group, said second group having a negative element and a negative doublet disposed successively along said axis in a direction from said object side to said image side, the improvement comprising a first group having only two elements which are a first and a second positive element each having at least one curved surface, a positive diffractive focussing element on the curved surface of one of said two positive elements.

2. The improvement as set forth in claim 1 wherein said first element is a bi-convex lens and has a front surface facing said object side and a back surface facing said image side, said diffractive element is surface of one of said front and back surfaces of said first lens of said first group.

3. The improvement as set forth in claim 2 wherein said diffractive element is on the back surface of said first element.

4. The improvement as set forth in claim 1 wherein said second element of said first group is a meniscus having a convex surface facing said object side, said diffractive element being on said convex surface of said second element.

5. The improvement as set forth in claim 1 wherein said diffractive element is a blazed grating with annular lines around said optical axis which define a plurality of annular zones.

6. The improvement as set forth in claim 1 wherein none of said surfaces of said first and second elements is an asphere.

7. In a zoom lens having at least first, second and third groups disposed successively along an optical axis between an object side and an image side where an image of an object is focussed at an image plane with a zoom magnification ratio range of at least 3× and aberrations due to said first and second groups remain substantially constant over said zoom range and are substantially corrected at said image plane by said third group, wherein said second group has only two elements which are a first and a second lens element disposed successively along said axis in a direction from said object side to said image side, first and second element of said second group having at least one curved surface with a diffractive focussing element thereon.

8. The improvement as set forth in claim 7 wherein said first lens element of said two lens element second group is bi-concave and said second element of said second group has a concave surface facing said object side, said diffractive element being on said concave surface of said second lens element of said second group.

9. The improvement as set forth in claim 7 wherein said diffractive element and the one of said first and second element on which said diffractive element is disposed, have negative power.

10. The improvement as set forth in claim 9 wherein said first element of said second group also has negative power.

11. The improvement as set forth in claim 7 wherein said diffractive focusing element is provided by a blazed grating of lines defining annular zones around said optical axis.

12. The improvement according to claim 1 wherein said zoom lens has in all zoom positions F/# not exceeding 2.0 and said first group maintains said F/# not exceeding F/2.0.

13. In a zoom lens having at least first, second and third groups disposed successively along an optical axis between an object side and an image side where an image of an object is focussed at an image plane with a zoom magnification ratio range of at least 3× and aberrations due to said first and second groups remain substantially constant over said zoom range and are substantially corrected at said image plane by said third group, the improvement comprising (i) a first group having only two elements which are a first and a second positive element each having at least one curved surface, a positive diffractive focussing element on the curved surface of one of said two positive elements and (ii) said second group has only two elements which are a first and a second lens element disposed successively along said axis in a direction from said object side to said image side, first and second element of said second group having at least one curved surface with a diffractive focussing element thereon.

14. The improvement as set forth in claim 13 wherein said first lens element of said two lens element second group is bi-concave and said second element of said second group has a concave surface facing said object side, said diffractive element being on said concave surface of said second lens element of said second group.

15. The improvement as set forth in claim 13 wherein said diffractive element of said second group and the one of said first and second element on which said diffractive element is disposed, have negative power.

16. The improvement as set forth in claim 13 wherein said first element of said second group also has negative power.

17. The improvement as set forth in claim 13 wherein said diffractive focusing element is provided by a blazed grating of lines defining annular zones around said optical axis.

18. The improvement according to claim 13 wherein said zoom lens has in all zoom positions F/# not exceeding 2.0 and said first group maintains said F/# not exceeding F/2.0.

19. The improvement as set forth in claim 13 wherein said first element of said first group is a bi-convex lens and has a front surface facing said object side and a back surface facing said image side, said diffractive element is on the back surface of said first element of said first group.

20. An improvement as set forth in claim 13 wherein said second element of said first group is a meniscus having a convex surface facing said object side, said diffractive element being on said convex surface of said second element of said first group.

* * * * *

UNITED STATES PATENT AND TRADEMARK OFFICE
CERTIFICATE OF CORRECTION

PATENT NO. : 5,717,525
DATED : February 10, 1998
INVENTOR(S) : Lee R. Estelle, et al It is certified that error appears in the above-identified patent and that said Letters Patent is hereby corrected as shown below: On the title page: Item [60] insert -- US Provisional Application No. 60/002,438, filed 16 August 1995 --

Column 1, Line 2 -- CROSS REFERENCE TO RELATED APPLICATION; Reference is made to and priority claimed from US Provisional Application Serial No. 60/002,438, filed 16 August 1995, entitled ZOOM LENSES --

Signed and Sealed this

Twenty-sixth Day of May, 1998

Attest:

BRUCE LEHMAN

*Attesting Officer*     *Commissioner of Patents and Trademarks*